(12) United States Patent
Srinivasan et al.

(10) Patent No.: US 10,650,610 B2
(45) Date of Patent: May 12, 2020

(54) SEAMLESS SWITCHING BETWEEN AN AUTHORING VIEW AND A CONSUMPTION VIEW OF A THREE-DIMENSIONAL SCENE

(71) Applicant: MICROSOFT TECHNOLOGY LICENSING, LLC, Redmond, WA (US)

(72) Inventors: Vidya Srinivasan, Issaquah, WA (US); Andrew John Howe, Sammamish, WA (US); Michael Lee Smith, Kirkland, WA (US); Harold Anthony Martinez Molina, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 15/971,619

(22) Filed: May 4, 2018

(65) Prior Publication Data
US 2019/0340832 A1 Nov. 7, 2019

(51) Int. Cl.
*G06T 19/20* (2011.01)
*G06T 19/00* (2011.01)
*G06F 3/0484* (2013.01)

(52) U.S. Cl.
CPC ............ *G06T 19/20* (2013.01); *G06T 19/006* (2013.01); *G06F 3/04842* (2013.01); *G06F 3/04845* (2013.01); *G06F 2203/04802* (2013.01); *G06T 2219/024* (2013.01);
(Continued)

(58) Field of Classification Search
CPC .................................................. G06T 19/006
See application file for complete search history.

(56) References Cited

U.S. PATENT DOCUMENTS

2006/0170652 A1* 8/2006 Bannai .................... G06F 3/011
  345/156
2013/0314421 A1* 11/2013 Kim ........................ G09B 5/065
  345/427
(Continued)

OTHER PUBLICATIONS

Freese, Peter, "Introducing Holographic Emulation," Retrieved from blogs.unity3d.com/2016/09/29/introducing-holographic-emulation/, Sep. 29, 2016, 5 pages. (Year: 2016).*
(Continued)

*Primary Examiner* — Ryan McCulley
(74) *Attorney, Agent, or Firm* — Newport IP, LLC; Jacob P. Rohwer (57) ABSTRACT

A platform configured to operate in different modes so that users can seamlessly switch between an authoring view and a consumption view while creating a three-dimensional scene is described herein. A first mode includes an authoring mode in which an authoring user can add and/or edit content displayed in a three-dimensional scene via a computing device. The second mode includes a consumption mode in which the authoring user can preview and/or share the content displayed in the three-dimensional scene via a head-mounted display device that is in some way connected to and/or in communication with the computing device. Consequently, the same platform (e.g., application) enables the authoring user to toggle between the two different modes while creating a three-dimensional scene that is part of an experience.

19 Claims, 7 Drawing Sheets

(52) U.S. Cl.
CPC ............ *G06T 2219/2012* (2013.01); *G06T 2219/2016* (2013.01); *G06T 2219/2024* (2013.01)

(56) References Cited

U.S. PATENT DOCUMENTS

| | | | | |
|---|---|---|---|---|
| 2015/0040074 | A1* | 2/2015 | Hofmann | G06T 19/006 715/852 |
| 2018/0143756 | A1* | 5/2018 | Mildrew | G06F 3/011 |
| 2019/0187876 | A1* | 6/2019 | Platt | H04N 13/344 13/344 |
| 2019/0236842 | A1* | 8/2019 | Bennett | G02B 27/0172 |

OTHER PUBLICATIONS

Batt, Simon, "How to Unlock 'In Use' Files in Windows," Retrieved from maketecheasier.com/unlock-in-use-files-windows/, Aug. 9, 2017, 4 pages. (Year: 2017).*

"Amazon Sumerian", Retrieved From https://aws.amazon.com/sumerian/, Retrieved on: Mar. 28, 2018, 13 Pages.

"Amazon Sumerian Editor Canvas", Retrieved From https://docs.aws.amazon.com/sumerian/latest/userguide/editor-canvas.html, Retrieved on: Mar. 28, 2018, 1 Page.

"InstaVR Launches Live Previewer, Enabling Users to Experience Work-in-Progress Apps Natively", Retrieved From http://www.instavr.co/articles/general/instavr-launches-live-previewer-enabling-users-to-experience-work-in-progress-apps-natively, Jul. 28, 2017, 8 Pages.

Bitner, Jerad, "11 Tools for VR Developers", Retrieved From https://www.lullabot.com/articles/11-tools-for-vr-developers, Jul. 21, 2017, 7 Pages.

Boyd, Tristan, "Build a Virtual Reality Website for HTML5 Browsers", Retrieved From https://bitmovin.com/htm15-vr-player-virtual-reality-technology/, Jun. 23, 2016, 14 Pages.

Edwards, Ada Rose., "A Guide to Virtual Reality for Web Developers", Retrieved From https://www.smashingmagazine.com/2017/09/guide-virtual-reality-web-developers/, Sep. 4, 2017, 37 Pages.

Fisher, Scott S., "An Authoring Toolkit for Mixed Reality Experiences", In Proceedings of 1st International Workshop on Entertainment Computing, May 14, 2002, pp. 1-8.

Freese, Peter, "Unity Blog—Introducing Holographic Emulation", Retrieved From https://blogs.unity3d.com/2016/09/29/introducing-holographic-emulation/, Sep. 29, 2016, 20 Pages.

Weaver, et al., "Bringing WebVR to everyone with the Windows 10 Fall Creators Update", Retrieved From https://blogs.windows.com/msedgedev/2017/10/10/bringing-webvr-everyone-windows-10-fall-creators-update/, Oct. 10, 2017, 10 Pages.

* cited by examiner

FIG. 7

SEAMLESS SWITCHING BETWEEN AN AUTHORING VIEW AND A CONSUMPTION VIEW OF A THREE-DIMENSIONAL SCENE

BACKGROUND

As use of head-mounted display devices becomes more prevalent, an increasing number of users can participate in an experience in which content is displayed via augmented reality techniques, mixed reality techniques, and/or virtual reality techniques. Furthermore, more and more people are wanting to create these experiences for a particular purpose (e.g., an employee training experience for new employee training, a marketing experience for potential purchasers of a service such as a vacation or an item such as a pair of skis, etc.).

However, creation of these experiences is limited to developers that possess high-level skills and technical capabilities. For example, to create an experience, a person must have the technical capability to program the spatial aspects of a three-dimensional scene, the motion of objects in the three-dimensional scene, the texture of objects in the three-dimensional scene, the lighting of objects in the three-dimensional scene, and so forth. The average person does not possess these high-level skills and technical capabilities, and thus, the average person is typically unable to create these types of experiences.

SUMMARY

The techniques described herein provide a platform that enables a user, that does not possess the high-level skills and technical capabilities typically needed, to create an experience that includes three-dimensional scenes. The creation of the experience may be referred to herein as the "authoring" of the experience. As described herein, the platform is configured to operate in different modes. A first mode includes an authoring mode in which the user can add and/or edit content displayed in a three-dimensional scene via a display of a computing device (e.g., a laptop computing device, a desktop computing device, a tablet computing device, a smartphone computing device, etc.). The second mode includes a consumption mode in which the user can preview and/or share the content displayed in the three-dimensional scene via a display of a head-mounted display device that is in some way connected to and/or in communication with the computing device. Consequently, the same platform (e.g., application) enables the user to toggle between the two different modes while creating a three-dimensional scene that is part of an experience. In various examples, execution of the platform is coordinated across the computing device and the connected head-mounted display device.

In one example, the platform can comprise a stand-alone application installed on the computing device and, while in the authoring mode, the stand-alone application allows a user to author a three-dimensional scene in an application window. That is, the three-dimensional scene can be graphically projected (e.g., represented) on to a planar display surface of the computing device (e.g., a display screen of a laptop computing device or a touch screen of a tablet or smartphone). In another example, the platform can comprise a Web-enabled application accessible via a Web browser executing on the computing device and, while in the authoring mode, the Web-enabled application allows a user to author a three-dimensional scene in a Web browser window and/or Web browser tab. Again, the three-dimensional scene can be graphically projected on to a planar display surface of the computing device. The Web-enabled application can include functionality that is executed: on the computing device, on a network device (e.g., a server of a content or service provider) in communication with the computing device over a network, or across both a computing device and a network device. The platform provides a user (may also be referred to as an authoring user) with an "authoring" view of the three-dimensional scene via a display of the computing device on which the platform is executing. In the authoring mode, authoring controls are configured and/or displayed. In various examples, the authoring controls enable the authoring user to access and select a background as a starting point for scene creation. The authoring controls further enable the authoring user to access and select widgets configured to add objects to the three-dimensional scene. The authoring controls even further enable the authoring user to alter or change properties of the objects displayed in the three-dimensional scene. Consequently, the authoring controls are employed by the authoring user to create a three-dimensional scene that, once completed, can be part of an experience consumed by a number of users.

The authoring view further includes a switching control that is configured to switch from the authoring view of the three-dimensional scene to a "consumption" view of the three-dimensional scene. Accordingly, upon the switching control being activated, the platform switches from operating in the authoring mode to operating in the consumption mode. The consumption view is displayed in a three-dimensional immersive environment via a display of the connected head-mounted display device. The consumption view includes interaction controls that enable a user to interact with objects in the three-dimensional scene. However, in most implementations, the interaction controls do not enable a user to further author the three-dimensional scene. In other words, the interaction controls do not include the authoring controls. In alternative implementations, a same control associated with an object may be configured in both the authoring view and the consumption view.

Consequently, the techniques described herein provide an ability for an authoring user to seamlessly switch between an authoring view and a consumption view using a single user input (e.g., selection of a user interface element such as a button, a spoken voice command, etc.). This allows a user to preview the three-dimensional scene they are currently authoring in an efficient and effective manner. The preview can be private to the user such that the consumption view of the three-dimensional scene is not shared with other users. Alternatively, the preview can be an open preview such that the user shares the consumption view of the three-dimensional scene with other users. For instance, an authoring user can designate a list of consuming users that are authorized to access the consumption view of the three-dimensional scene (e.g., via a uniform resource locator or URL). Or, an authoring user can publish the consumption view of the three-dimensional scene for any consuming user to view (e.g., via a URL).

In various examples, the consumption view also includes a switching control that enables an authoring user to switch from the consumption view back to the authoring view. Accordingly, the user can easily return to the authoring view, at the point where the authoring user left off to switch to the consumption view and preview the three-dimensional scene, in order to continue authoring the three-dimensional scene.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

A platform configured to operate in different modes so that users can seamlessly switch between an authoring view and a consumption view while creating a three-dimensional scene is described herein. A first mode includes an authoring mode in which an authoring user can add and/or edit content displayed in a three-dimensional scene via a display of a computing device (e.g., a laptop computing device, a desktop computing device, a tablet computing device, a smartphone computing device, etc.). The second mode includes a consumption mode in which the authoring user can preview and/or share the content displayed in the three-dimensional scene via a display of head-mounted display device that is in some way connected to and/or in communication with the computing device. Consequently, the same platform (e.g., application) enables the authoring user to toggle between the two different modes while creating a three-dimensional scene that is part of an experience.

Conventional scene creation platforms do not provide an authoring user of a three-dimensional scene that is part of an experience (e.g., an augmented reality experience, a mixed reality experience, and/or a virtual reality experience) with an efficient and effective way to preview how the three-dimensional scene appears in a three-dimensional immersive environment displayed via a display of a head-mounted display device, for example. Rather, these conventional scene creation platforms require the authoring user to create and save file(s) that include model data associated with a three-dimensional scene, and then transfer the file(s) from the scene creation platform to a disparate platform that can process the model data in order to rebuild the three-dimensional scene in a three-dimensional immersive environment capable of being displayed via a display of a head-mounted display device. Then, the authoring user must return to the scene creation platform to continue authoring the three-dimensional scene. This switching between multiple platforms each time an authoring user wants to preview his or her work, as required by the conventional techniques during authoring of a three-dimensional scene, is an inefficient process that can cause delays and user frustration. In addition to the delays and user frustration, an excessive amount of computing resources (e.g., processing resources, storage resources, and/or networking resources) are consumed by migrating files, launching different platforms, and rebuilding the three-dimensional scene.

In contrast to the conventional process described above which requires an authoring user to switch between disparate platforms in order to consume a three-dimensional scene that the authoring user is currently creating, the techniques described herein provide an ability for an authoring user to use a same platform to seamlessly switch between an authoring view and a consumption view using a single user input (e.g., selection of a user interface element such as a button, a spoken voice command, etc.). This allows a user to preview the three-dimensional scene they are currently authoring in an efficient and effective manner. Moreover, the user can effectively share the three-dimensional scene with other users (e.g., team members, colleagues, etc.) so the other users can also preview the three-dimensional scene. In some situations, the other users can provide feedback to the authoring user about the three-dimensional scene, and with the feedback, the authoring user can seamlessly switch back to the authoring view to incorporate the feedback into the three-dimensional scene.

Various examples, scenarios, and aspects are described below with reference to FIGS. 1-7.

Figure 1:
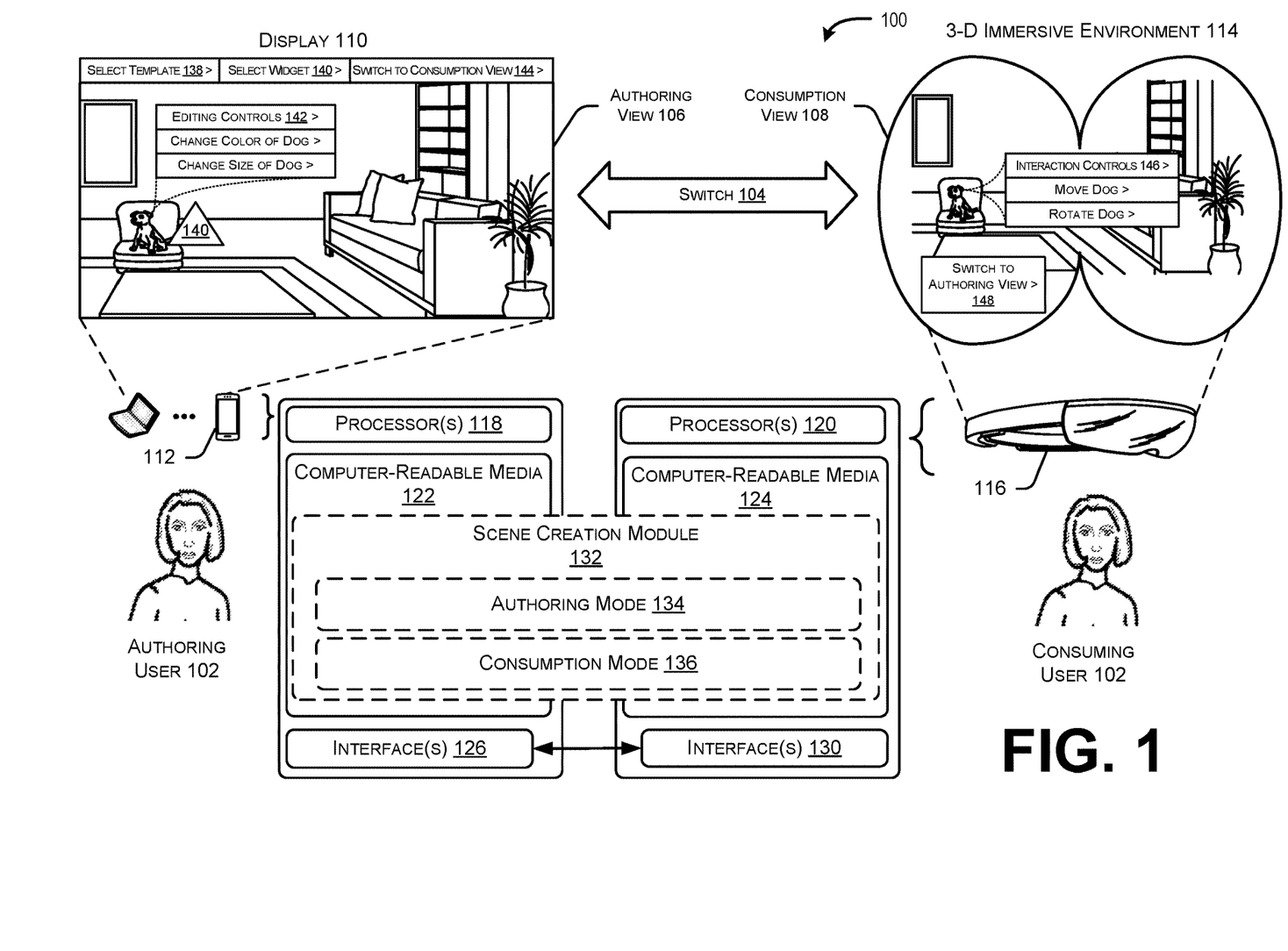
FIG. 1 is a diagram illustrating an example of how a user can seamlessly switch, using different devices and/or displays, between an authoring view and a consumption view of a three-dimensional scene the user is currently authoring.

FIG. 1 is a diagram 100 illustrating an example of how a user 102 can seamlessly switch 104 between an authoring view 106 and a consumption view 108 of a three-dimensional scene the user 102 is currently authoring. In this example, the same user 102 is both an authoring user and a consuming user (e.g., the consumption view 108 is a private view).

The authoring view 106 of the three-dimensional scene can be graphically projected on to a planar surface via a display 110 associated with a computing device 112, such as a laptop computing device or smartphone computing device. The graphical projection of a three-dimensional scene on to a planar surface may be referred to as a "two and half" or "2.5" dimensional display. Creation of three-dimensional scenes typically occurs on planar display screens because an application executing on the computing device 112 provides an effective means to access content over a network and add the content to the three-dimensional scene. For example, the application can be a stand-alone application installed on the computing device 112 or the application can be a Web-enabled application accessible via a Web browser executing on the computing device 112. Consequently, the application can be used as a tool that provides a scene creation "canvas" to an authoring user such that the authoring user can select and add content to create a three-dimensional scene.

The consumption view 108 of the three-dimensional scene can to be displayed in a three-dimensional immersive environment 114 via a display of a head-mounted display device 116. An authoring user may want to switch to the consumption view 108 to preview a current three-dimensional scene being authored because the planar surface of the display 110 does not provide a three-dimensional immersive environment in which the spatial and geometric aspects of the scene can be fully appreciated.

The computing device 112 and the head-mounted display device 116 may include respective processor(s) 118 and 120, examples of which are further described herein. Moreover, computing device 112 and the head-mounted display device 116 may include respective computer-readable media 122 and 124, as well as communication interface(s) 126 and 130, examples of which are further described herein. The computing device 112 and the head-mounted display device 116 coordinate and communicate with one another to execute a scene creation module 132. The scene creation module 132 comprises the aforementioned platform that is configured to operate in both an authoring mode 134 and a consumption mode 136 across the devices. Accordingly, the scene creation module 132 provides the functionality for the user 102 to seamlessly switch from the authoring view 106 to the consumption view 108 so the user 102 can preview the three-dimensional scene in a three-dimensional immersive environment via a display of the head-mounted display device 116.

Moreover, the scene creation module 132 provides the functionality for the user 102 to seamlessly switch from the consumption view 108 back to the authoring view 106 so the user can continue to author the three-dimensional scene via a display 110 of the computing device 112. When switching back to the authoring view 106 using the techniques described herein, the user 102 is returned right to the point where he or she initially left the authoring mode to preview a current state of the three-dimensional scene. While the scene creation module 132 is shown to span both devices 112 and 116, it is understood in the context of this disclosure that each device executes code related to functionality implemented at the respective devices. Moreover, the functionality performed by the scene creation module 132 may be executed on a single device (e.g., computing device 112).

Examples of a head-mounted display device 116 include, but are not limited to: OCCULUS RIFT, GOOGLE DAYDREAM VIEW, MICROSOFT HOLOLENS, HTC VIVE, SONY PLAYSTATION VR, SAMSUNG GEAR VR, GOOGLE CARDBOARD, SAMSUNG HMD ODYSSEY, DELL VISOR, HP HEADSET, LENOVO EXPLORER, ACER HEADSET, ASUS WINDOWS MIXED REALITY HEADSET, or any augmented reality, mixed reality, and/or virtual reality devices.

Accordingly, in some instances, the head-mounted display device 116 may not include a processor or computer-readable media. Rather, the head-mounted display device 116 may comprise an output device configured to render data stored on the computing device 112 for display. For instance, the head-mounted display device 116 may be tethered to the computing device 112. Therefore, the interfaces 126, 130 of the computing device 112 and the head-mounted display device 116 can be configured to communicate via a wired and/or wireless Universal Serial Bus ("USB") connection, a BLUETOOTH connection, a High-Definition Multimedia Interface ("HDMI") connection, and so forth.

While operating in the authoring mode 134, the scene creation module 132 configures and/or displays authoring controls which provide authoring functionality based on user input. As used herein, a "control" can comprise a displayed graphical user interface (GUI) element (e.g., a button, an object, etc.) that is activated based on an interaction between the GUI element and user input (e.g., a user selects or clicks on the GUI element). A control can alternatively be configured to accept and/or detect other forms of input such as a voice command or a gesture. Thus, a control may be configured to receive user input but may not necessarily be displayed as a GUI element. As shown in the diagram 100 of FIG. 1, a first type of authoring control 138 enables a user to select a template. For instance, the authoring control 138 can cause a menu that lists templates available to the authoring user 102 to be displayed for selection. Alternatively, this type of authoring control 138 can comprise a search field that allows the user to search for a template in a library of templates.

In various examples, a template provides a starting point for three-dimensional scene creation. To this end, a template can be selected and retrieved from a library of available templates. A template comprises an environment file that includes representations of models (e.g., models that define the spatial geometry of a background for a three-dimensional scene, models that define the spatial geometry of a panorama for a three-dimensional scene, etc.). The selected template can be used by the scene creation module 132 to generate an initial three-dimensional scene to be presented on display 110. For instance, in the diagram 100 of FIG. 1, the user has selected a template 138 that models a living room that includes a couch with pillows, a chair, a coffee table, a book shelf, a plant, and a picture frame on the wall.

A second type of authoring control 140 configured and/or displayed by the scene creation module 132 enables the user to select a widget. Selection of a widget enables an object to be added to the three-dimensional scene (e.g., laid on top of the underlying background modeled by the selected template 138). The object can be a three-dimensional object (e.g., a figure, shape, etc.) or a two-dimensional object (e.g., an image such as a photo or a logo, a document, etc.). A widget comprises information (e.g., instructions) useable to access and display data configured to model an object in a two-dimensional and/or three-dimensional coordinate space. For example, a widget can comprise a uniform resource locator (URL) that refers to an accessible network location at which the data is stored and from which the data can be retrieved by the scene creation module 132. In various examples, this type of authoring control 140 can also cause a menu that lists widgets available to the user to be displayed for selection. Alternatively, this type of authoring control 140 can comprise a search field that allows the user to search for a widget in a library of widgets. In the example diagram 100 of FIG. 1, the user has selected a widget 140 that retrieves data modeling a dog, and thus, a dog is added to the three-dimensional scene on top of the underlying background modeled by the selected template 138.

In some examples, authoring control 140 can include a moveable anchoring point as represented by the triangle in the three-dimensional scene displayed in the two-dimensional coordinate space 110. This enables the authoring user 102 to navigate the authoring control to a position in the three-dimensional scene at which the authoring user 102 wants to add an object.

A third type of authoring control 142 enables the authoring user 102 to alter or change properties of a displayed object that has been added to the three-dimensional scene (e.g., the dog). Again, this type of authoring control 142 can cause a menu that lists different properties that can be changed. Alternatively, this type of authoring control 142 can comprise a search field that allows the user to search for a property that can be changed.

A property of an object can comprise a transform property such as an initial display orientation of the object, a scale (e.g. a size) of the object, a shading of the object, or a texture of the object. A property of an object can also or alternatively comprise an initial display position of the object in the three-dimensional scene, whether the object is moveable or animated or is only displayed in a fixed location, whether a consuming user can move the object, a color of the object, a display association between the object and another object in the three-dimensional scene (e.g., a grouping of objects such that if a consuming user moves one object the other object also moves), or a display association between the object and another three-dimensional scene (e.g., if the user selects or clicks on the object then the user will be taken to another three-dimensional scene in the experience). Further properties of an object include: a sound associated with or produced by the object, deletion of the object from the scene, or a display ability of the object to adapt to a real-world scene (e.g., always place a picture on a room wall rather than on the floor in an augmented or mixed reality environment). In the diagram 100 of FIG. 1, the user is presented with an option to change the color of the dog and to change the size of the dog.

The authoring view 106 further displays and/or is configured with a switching control 144 that switches from the authoring view 106 to the consumption view 108. Accordingly, upon the switching control 144 being activated (e.g., via a selection of a GUI element, a voice command, a detected gesture, etc.), the scene creation module 132 switches from operating in the authoring mode 134 to operating in the consumption mode 136 thereby enabling the authoring user 102 to become a consuming user 102 previewing the three-dimensional scene in a three-dimensional immersive environment via a display of the connected head-mounted display device 116.

The consumption view 108 displays and/or is configured with interaction controls 146 that enable a user to interact with objects in the three-dimensional scene. In most implementations, the interaction controls do not enable a user to perform scene authoring functions, such as adding an object to the three-dimensional scene, deleting an object from the three-dimensional scene, and/or changing certain properties of an object. In other words, the interaction controls 146 do not include the types of authoring controls referred to by 138, 140, and 142 (e.g., the authoring controls are hidden in the consumption view 108). In alternative implementations, a same control associated with an object may be configured in both the authoring view and the consumption view.

The consumption view 108 further displays and/or is configured with a switching control 148. Similar to switching control 144, switching control 148 switches from the consumption view 108 back to the authoring view 106. Accordingly, upon the switching control 148 being activated (e.g., via a selection of a GUI element, a voice command, a detected gesture, etc.), the scene creation module 132 switches from operating in the consumption mode 136 to operating in the authoring mode 134 thereby enabling the user 102 to return to the same point where the user 102 left off, in order to continue authoring the three-dimensional scene.

Figure 2:
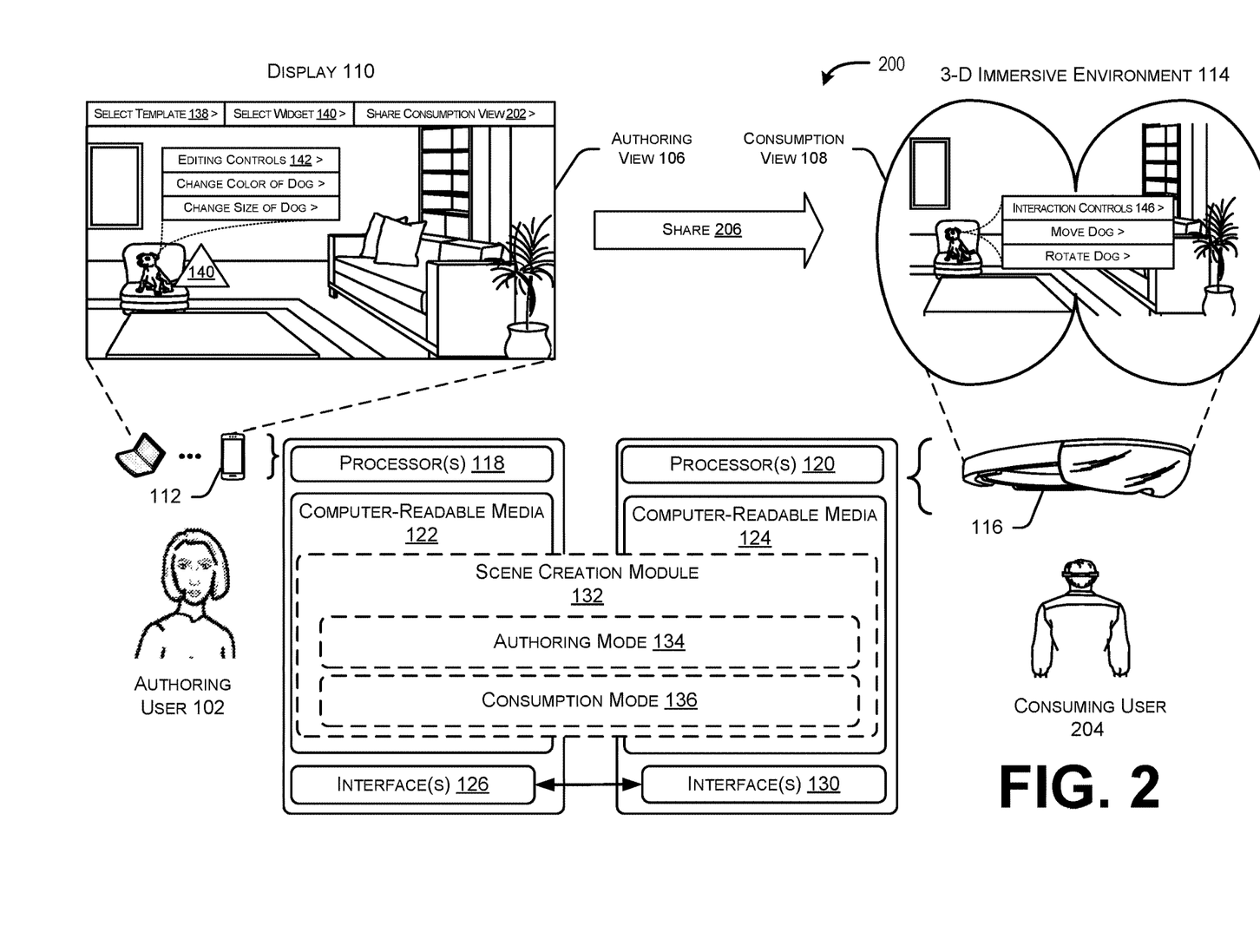
FIG. 2 is a diagram illustrating an example of how a user can seamlessly share, with other users, a consumption view of a three-dimensional scene the user is currently authoring.

FIG. 2 is a diagram 200 illustrating an example of how a user 102 can seamlessly share, with other users, a consumption view 108 of a three-dimensional scene the user is currently authoring. The diagram 200 of FIG. 2 is similar to the diagram of FIG. 1 (e.g., they include common elements). However, in contrast to the diagram 100 in FIG. 1, the authoring and the consumption in the diagram 200 of FIG. 2 are not performed by the same user. Accordingly, the authoring view 106 in FIG. 2 displays a control 202 to share the consumption view with a consuming user 204. The control 202 can be displayed and/or configured along with the control 144 in FIG. 1. In some implementations, a single control can be used to enable the consumption view 108 for the authoring user 102 (as described with respect to FIG. 1) and for a different consuming user 204.

Upon activation of the control 202, the scene creation module 132 switches from the authoring mode 134 to the consumption mode 136, and the scene creation module 132 shares 206 the three-dimensional scene. In one example, the sharing 206 of the three-dimensional scene can be limited such that the three-dimensional scene is only shared with authorized users. Thus, the consuming user 204 is an authorized user with certain permissions. The authoring user 102 can designate a list of authorized consuming users 204 and a notification (e.g., a text message, an email, a social media message, a collaboration tool chat message, etc.) of the shared three-dimensional scene can be sent to the authorized consuming users 204. The notification can include a link (e.g., a uniform resource locator) to the three-dimensional scene. Consequently, the authorized consuming users 204 can view and consume the three-dimensional scene via a three-dimensional coordinate space on their own head-mounted display devices 116. In some instances, the authorized consuming users 204 can view and interact with the three-dimensional scene and provide feedback to the authoring user 102.

In another example, the sharing 206 of the three-dimensional scene can be a public sharing such that the three-dimensional scene is shared with any consuming user. This type of sharing can be implemented via a uniform resource locator (URL) that can be publicly accessed. Thus, the consuming user 204 can also be any user capable of accessing the shared three-dimensional scene via the URL. Note that the consumption view 108 in FIG. 2 does not include the authoring control 148 to switch back to the authoring mode 134 and the authoring view 106, as this control is reserved for the authoring user 102.

The examples illustrated in FIG. 1 and FIG. 2 refer to a three-dimensional scene being previewed and/or shared via the consumption view 108. In various implementations, the preview and/or sharing of the three-dimensional scene can be part of a preview and/or sharing of multiple three-dimensional scenes. For instance, an authoring user 102 may be authoring multiple three-dimensional scenes simultaneously (e.g., switching between the multiple three-dimensional scenes). Upon activation of control 144 and/or control 202, each of the multiple three-dimensional scenes can be configured in a consumption view 108 so users can preview each of the multiple three-dimensional scenes (e.g., in sequence, based on user input that navigates from a currently displayed three-dimensional scene to a next three-dimensional scene, etc.).

Figure 3:
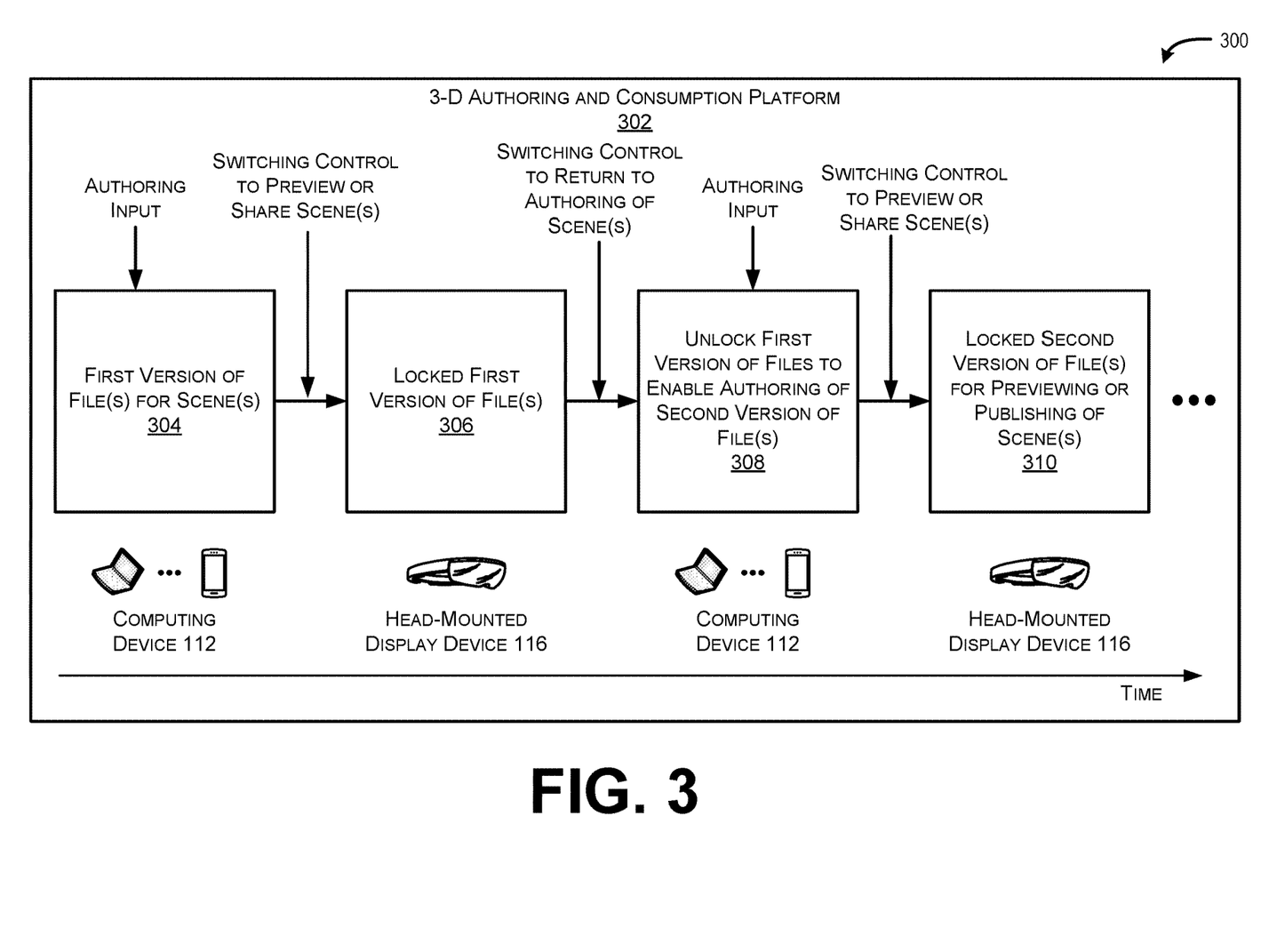
FIG. 3 is a diagram illustrating an example of how a three-dimensional authoring and consumption platform enables an authoring user to perform multiple switching iterations so that a three-dimensional scene can be previewed in a three-dimensional immersive environment throughout the authoring process and/or until the authoring is completed.

FIG. 3 is a diagram 300 illustrating an example of how a three-dimensional authoring and consumption platform 302 enables an authoring user to perform multiple switching iterations so that a three-dimensional scene can be previewed in a three-dimensional immersive environment throughout the authoring process and/or until the authoring is completed. The three-dimensional authoring and consumption platform 302 comprises the scene creation module 132 illustrated in FIGS. 1 and 2, which can be executed across a computing device 112 and head-mounted display device(s) 116 of users that want to consume (e.g., preview) a three-dimensional scene of an experience currently being authored. As further described herein, aspects of the scene creation module 132 can also be implemented on a network device, such as a server of a content and/or service provider.

On the left, the diagram 300 shows that, in a first iteration, authoring input is provided to create a first version of one or more files 304 for one or more three-dimensional scenes. As described above, the authoring input can include a selection of a background, an addition of an object, a deletion of an object, and/or a change to a property of the object. The authoring input can be provided via an input mechanism associated with the computing device 112 as a three-dimensional scene is displayed on a display screen with a planar surface. At some point in time, an authoring user provides further user input to activate a switching control to preview and/or share the three-dimensional scene. Based on the activation of the switching control, the three-dimensional authoring and consumption platform 302 performs an action to capture the current state of authoring. For instance, the three-dimensional authoring and consumption platform 302 locks the first version of the files 306.

Once the first version of the files 304 is locked, the locked files 306 can be used to generate the consumption view 108 to be displayed via a head-mounted display device 116 so a consuming user can preview the current state of the authoring in a three-dimensional immersive environment. Then, at a later point in time, an authoring user provides user input to activate a switching control to return to the authoring of the three-dimensional scene displayed via the computing device 112. Based on the activation of this switching control, the locked first version of the files is unlocked, and authoring input can again be provided via a second iteration to create a second version of the files 308. When the authoring user 102 or another consuming user wants to preview a current state of the three-dimensional scene being authored, the authoring user again provides user input to activate a switching control to preview and/or share the three-dimensional scene. Based on the activation of the switching control, the three-dimensional authoring and consumption platform 302 locks the second version of the files 310 to capture the current state of authoring.

Individual iterations of switching between authoring and consumption can continue to be implemented over a period of time and throughout the authoring process until the three-dimensional scene is created to the author's and/or other users' liking.

In contrast to the conventional process which requires a user to move files between disparate platforms in order to author and consume a three-dimensional scene, the techniques described herein provide an ability for a user to use a same platform to seamlessly switch between an authoring view and a consumption view by capturing a current state (e.g., the locking and unlocking of different versions of files) of data useable to model and build a three-dimensional scene. Consequently, the techniques described herein can save computing resources because the files do not need to be transferred from an authoring platform to a disparate consumption platform when a user wants to preview a three-dimensional scene currently being authored.

Figure 4:
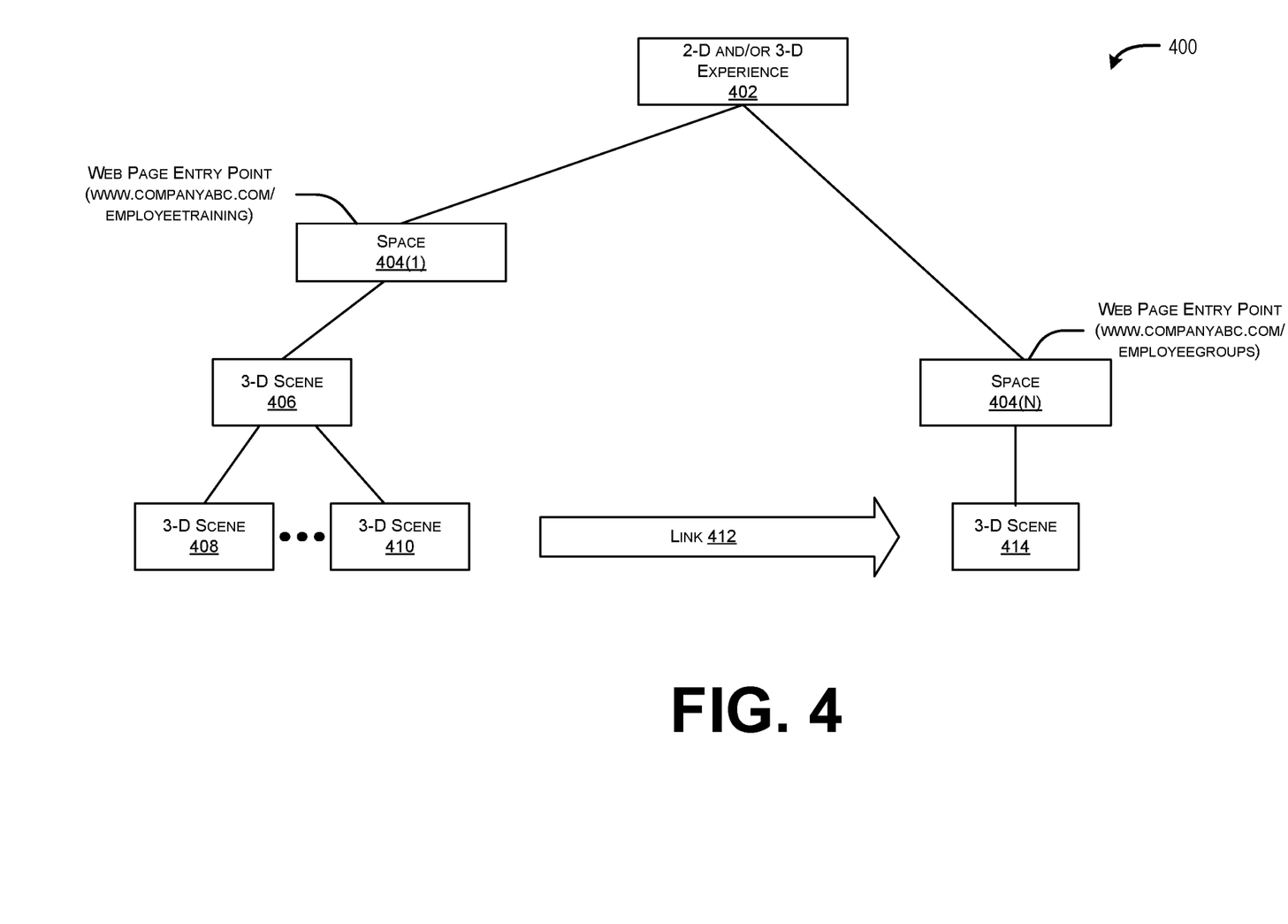
FIG. 4 is a diagram illustrating an example experience, of which three-dimensional scene(s) being authored by a user can be a part.

FIG. 4 is a diagram 400 illustrating an example experience 402, of which three-dimensional scene(s) being authored by a user 102 can be a part. As shown, the experience 402 can include two-dimensional scenes and/or three-dimensional scenes. Generally, an experience 402 includes related and/or linked content that can be accessed and/or displayed for a particular purpose. As a specific example, the experience 402 can include company content an employer wants a new employee to know, to be informed about, or to learn, and thus, the new employee can access the experience 402 when he or she starts a new job. In another specific example, the experience 402 can include lesson content a school teacher wants a student to know, to be informed about, or to learn, and thus, the student can access the experience when he or she dives into a particular lesson.

An experience 402 can include one or more spaces 404(1) through 404(N) (where N is a positive integer number such as one, two, three, four, and so forth). A space comprises a segment or type of content within the broader experience 402. There is no limitation how one segment or type of content can be distinguished from another segment or type of content in the same experience 402. Continuing an example from above and to further illustrate, space 404(1) can include company content that relates to job training for a new employee, while space 404(N) can include company content related to different interest and activity groups for which the employer provides a budget (e.g., a hiking group, a skiing group, a chess group, a religious study group, etc.). The employer may have a policy to inform a new employee about these interest and activity groups when he or she starts a new job, so the new employee can join if a common interest is shared. This example shows how the two types of content relate to a situation where a new employee is beginning employment with a company, yet the types of content are different and therefore different spaces can be authored within a broader experience 402.

As described above, a space can include three-dimensional scenes. In various implementations, an entry point for a user to consume a space can comprise a Web page (e.g., a URL), initially accessed via the computing device 112. For instance, a new employee can visit "www.companyABC.com/employeetraining" on his or her computing device 112 to enter space 404(1) that is part of the broader experience 402. The new employee can also visit "www.companyABC.com/employeegroups" on his or her computing device 112 to enter space 404(N) that is part of the broader experience 402. In a specific example, space 404(1) may include a home page that displays two-dimensional content (e.g. text and a few images). This home page may include a first link to three-dimensional scene 406, which may contain links to three-dimensional scene 408 and three-dimensional scene 410. The new employee can consume the three-dimensional scenes 406, 408, and 410 in a three-dimensional immersive environment using a head-mounted display device 116 connected to a computing device 112. These three-dimensional scenes 406, 408, and 410 can also comprise URLs that are part of the Web page (e.g., "www.companyABC.com/employeetraining/3Dscene408" and "www.companyABC.com/employeetraining/3Dscene410"). Moreover, a scene 410 in a first space 404(1) can provide a link 412 (e.g., via the selection of a displayed 2-D or 3-D object) to a three-dimensional scene 414 in a second space 404(N).

Accordingly, the authoring and consumption of three-dimensional scenes, as described herein, can be implemented as part of creation of an experience 402. In various examples, the experience 402 can be associated with one or more Web pages, yet aspects of the experience 402 can include, for example, one or more virtual reality (VR) three-dimensional scenes, one or more augmented reality (AR) three-dimensional scenes, and/or one or more mixed reality (MR) three-dimensional scenes. While the experience 402 shown in the example diagram 400 of FIG. 4 shows a limited number of spaces and scenes, it is understood in the context of this disclosure, that an experience can include any number of spaces (e.g., one, two, three, four, five, ten, twenty, one hundred) for related content and any number of scenes (e.g., one, two, three, four, five, ten, twenty, one hundred, etc.).

Figure 5:
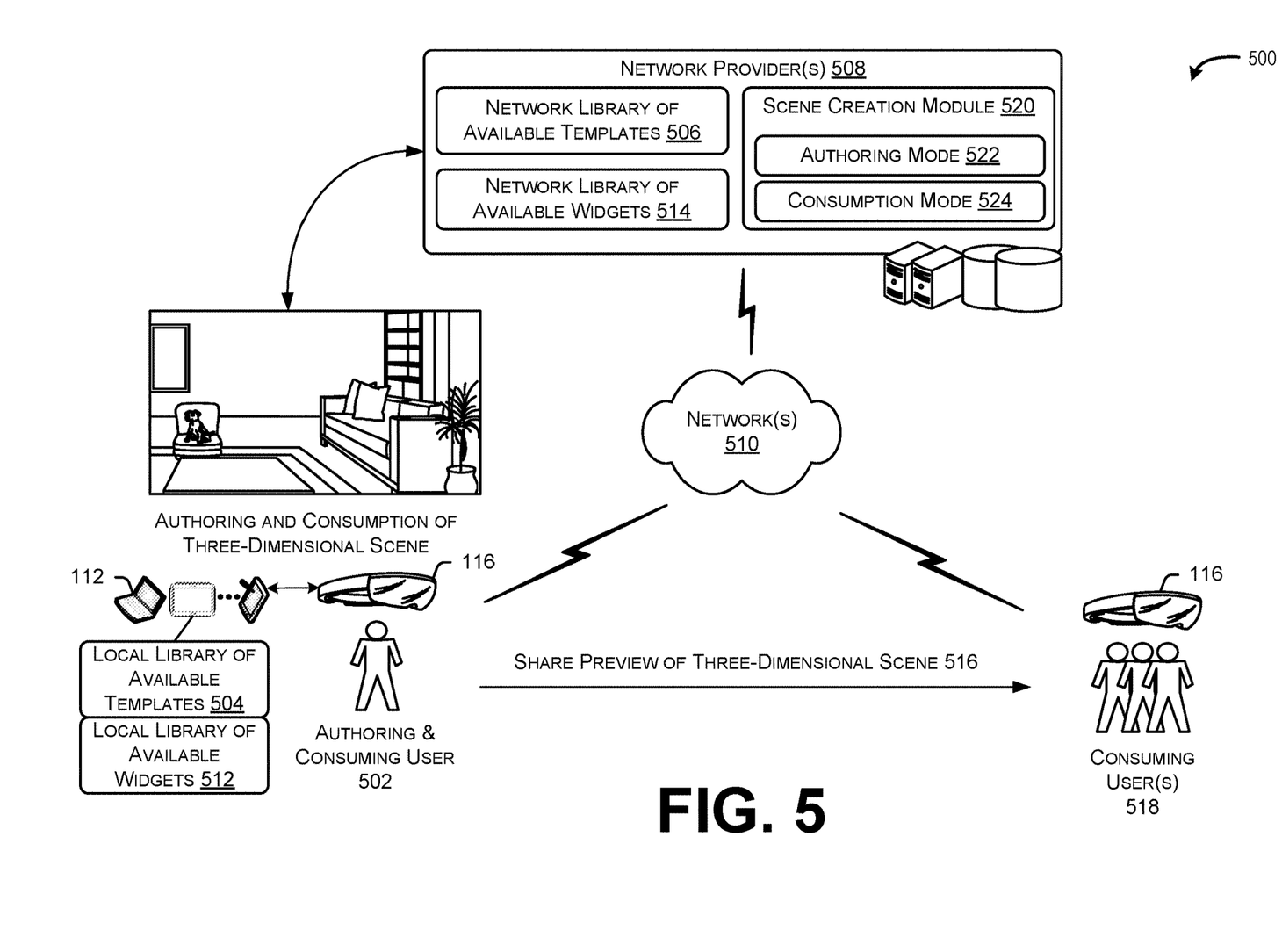
FIG. 5 is a diagram that illustrates an example of how network communications can be used to implement the techniques described herein.

FIG. 5 is a diagram 500 that illustrates an example of how network communications can be used to implement the techniques described herein. For instance, the diagram 500 illustrates an authoring and consuming user 502 (e.g., the authoring and consuming user 102 of FIG. 1) that employs a computing device 112 to author a three-dimensional scene. Moreover, the authoring and consuming user 502 employs a head-mounted display device 116 to consume and preview the three-dimensional scene.

As described above, to create the three-dimensional scene, the authoring and consuming user 502 can select a template (e.g., a scene background) that provides a starting point. The template may be selected from a library of available templates 504 stored locally at the computing device 112. Alternatively, the template may be selected from a network library of available templates 506 stored remotely at one or more network provider(s) 508 (e.g., content providers, service providers, etc.). In this situation, the template can be retrieved and downloaded to the computing device 112 via network(s) 510. The network provider(s) 508 shown in FIG. 5 can be a single provider or disparate providers.

Similarly, to create the three-dimensional scene, the authoring and consuming user 502 selects a widget configured to add an object to the template. The widget comprises information useable to access and display an object (e.g., a two-dimensional object or a three-dimensional object), or a collection of related objects that share an environment attribute. For instance, a widget may be configured to access skis and ski poles since they each share a common attribute—a single user uses them to ski down a hill. In one example, the widget comprises a uniform resource locator (URL) useable to access the object or the collection of related objects. The widget may be selected from a library of available widgets 512 stored locally at the computing device 112. Alternatively, the widget may be selected from a network library of available widgets 514 stored remotely at the one or more network provider(s) 508. In this situation, the widget, as well as the object and/or the collection of objects, can be retrieved and downloaded to the computing device 112 via network(s) 510.

In various implementations, the templates and/or widgets that are available to the user and/or selected to author a three-dimensional scene are associated with previously designed content (e.g., previously designed three-dimensional backgrounds and/or panoramas, previously designed objects or collection of objects, etc.). The content may have been designed by third-party developers and made available to the authoring and consuming user 502 via the network library of templates 506 and the network library of widgets 514. Alternatively, the content may have been designed by the authoring and consuming user 502.

The diagram 500 in FIG. 5 further illustrates that network(s) 510 can be used to share a preview of the three-dimensional scene 516 with other consuming users 518, as described above with respect to FIG. 2.

In various implementations, a network provider 508 can also include a scene creation module 520 that can operate in an authoring mode 522 and a consumption mode 524. The scene creation module 520 can comprise the network side of a Web-enabled application that is made available to a Web browser of the computing device 112. The scene creation module 520 may be provided as part of a collaborative, communication, or productivity framework. Accordingly, in some examples, aspects of a scene creation module (e.g., the authoring and consumption platform) can be executed across each of a network device, a computing device 112, and/or a head-mounted display device.

A computing device 112 useable to author and create a three-dimensional scene, as part of an experience for example, can include, but is not limited to: a game console, a desktop computer, a laptop computer, a gaming device, a tablet computer, a personal data assistant (PDA), a mobile phone/tablet hybrid, a telecommunication device, a network-enabled television, a terminal, an Internet of Things (IoT) device, a work station, a media player, or any other sort of computing device. In some implementations, the computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display screen, a touch screen, a printer, audio speakers, a haptic output device, and the like).

Network(s), such as network(s) 510, can include, for example, public networks such as the Internet, private networks such as an institutional and/or personal intranet, or some combination of private and public networks. Network(s) can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) can utilize communications protocols, including packet-based and/or datagram-based protocols such as internet protocol (IP), transmission control protocol (TCP), user datagram protocol (UDP), or other types of protocols. Moreover, network(s) can also include a number of devices that facilitate network communications and/or form a hardware basis for the networks, such as switches, routers, gateways, access points, firewalls, base stations, repeaters, backbone devices, and the like.

In various implementations, the interfaces of a computing device and a head-mounted display device can be configured to operate in accordance with, and communicate over, a personal area network (PAN) that uses a wired and/or a wireless connection. For example, a PAN connection can operate in accordance with Infrared Data Association ("IrDA"), BLUETOOTH, wired and/or wireless Universal Serial Bus ("USB"), Z-Wave, ZIGBEE, or other short-range wireless technology.

As used herein, a "processor" can represent, for example, a CPU-type processing unit, a GPU-type processing unit including a virtual GPU (VGPU), a field-programmable gate array (FPGA), a digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, "computer-readable media" can store instructions executable by a processor and/or data (e.g., model data for a scene, a template, or an object). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of memory included in a device and/or a hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The module provided in FIGS. 1, 2, and 5 is just an example, and the number of modules used to implement the three-dimensional authoring and consumption platform can vary higher or lower. That is, functionality described herein in association with the illustrated modules can be performed by a fewer number of modules or a larger number of modules on one device or spread across multiple devices.

Figure 6:
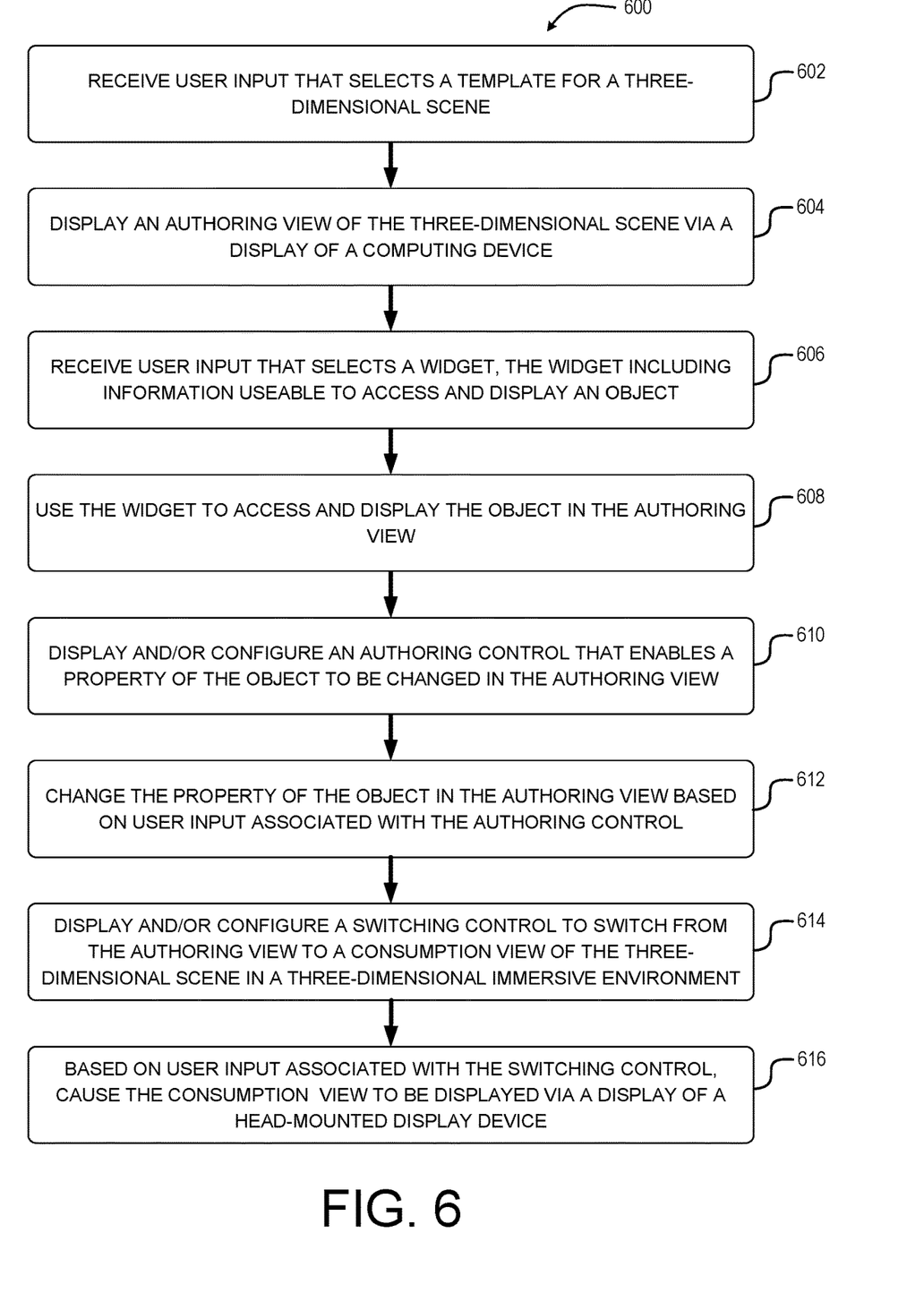
FIG. 6 is a diagram of an example flowchart that illustrates operations directed to using a single platform to switch from an authoring view of a three-dimensional scene, in which authoring controls are configured and/or displayed using a first display, to a consumption view of the three-dimensional scene in which interaction controls are configured and/or displayed using a second display.
Figure 7:
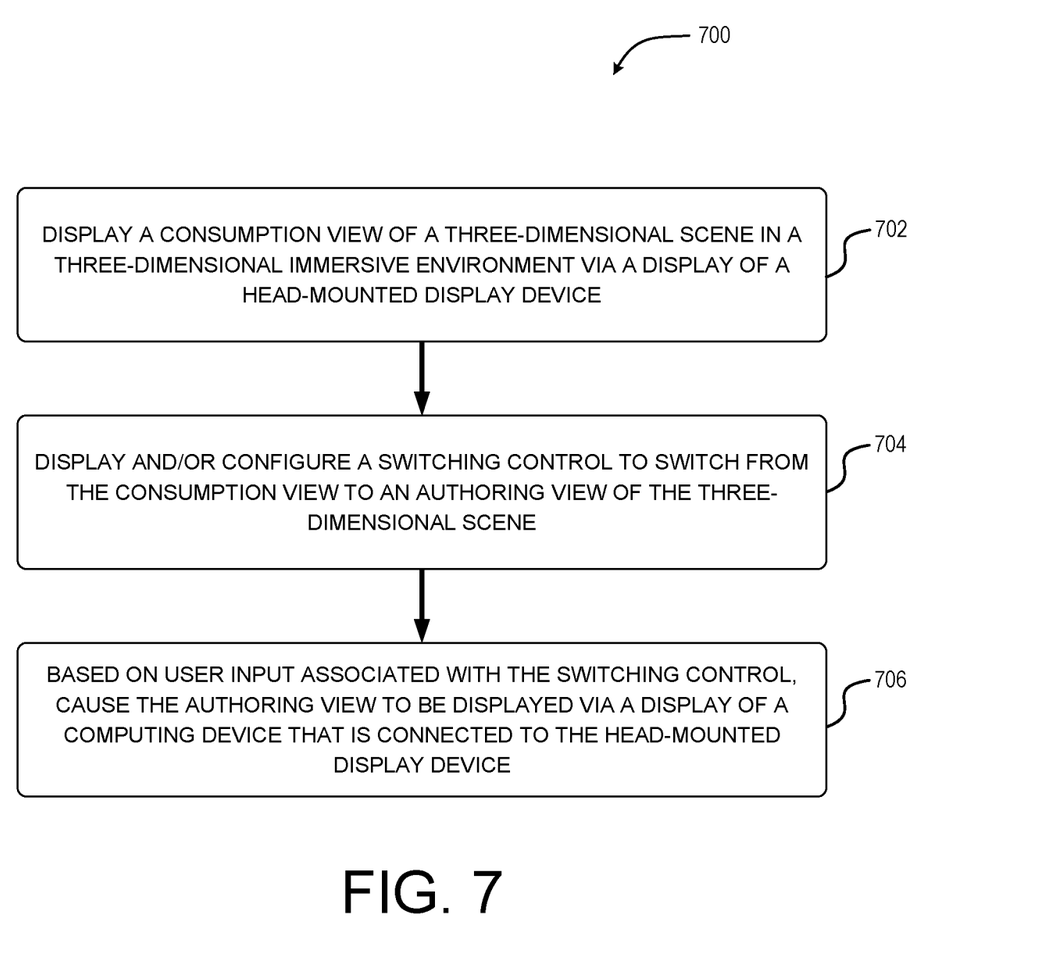
FIG. 7 is a diagram of an example flowchart that illustrates operations directed to using a single platform to switch from a consumption view of a three-dimensional scene back to an authoring view of the three-dimensional scene.

FIGS. 6 and 7 each contains a flowchart of a method. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, wearable computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Additionally, the operations described herein can be implemented as a sequence of computer implemented acts or program modules running on a computing system (e.g., computing device 112, a head-mounted display device 116, and/or devices of a network provider).

FIG. 6 is a diagram of an example flowchart 600 that illustrates operations directed to using a single platform to switch from an authoring view of a three-dimensional scene, in which authoring controls are configured and/or displayed on a first display, to a consumption view of the three-dimensional scene in which interaction controls are configured and/or displayed on a second display. The operations in FIG. 6 can be performed by the computing device 112, the head-mounted computing device 116, and/or a device of a network provider 508, as described above with respect to any one of FIGS. 1-5.

At operation 602, user input that selects a template for a three-dimensional scene is received. For example, the template can be accessed from a library of templates made available via a network provider and added to a blank canvas so that an authoring user can begin authoring a three-dimensional scene.

At operation 604, an authoring view of the three-dimensional scene is displayed via a display of a computing device such as a laptop computing device or a smartphone computing device.

At operation 606, user input that selects a widget is received. As described above, the widget includes information useable to access and display an object.

At operation 608, the widget is used to access and display the object in the authoring view of the three-dimensional scene.

At operation 610, an authoring control that enables a property of the object to be changed in the authoring view is displayed and/or configured.

At operation 612, the property of the object is changed in the authoring view based on user input associated with the authoring control (e.g., selection of a GUI element to activate the control, recognition of a voice command to activate the control, detection of a gesture to activate the control, etc.).

At operation 614, a switching control to switch from the authoring view to a consumption view of the three-dimensional scene in a three-dimensional immersive environment is displayed and/or configured.

At operation 616, based on user input associated with the switching control, the consumption view of the three-dimensional scene in the three-dimensional immersive environment is caused to be displayed via a display of a head-mounted display device connected to the computing device.

FIG. 7 is a diagram of an example flowchart 700 that illustrates operations directed to using a single platform to switch from a consumption view of a three-dimensional scene back to an authoring view of the three-dimensional scene. The operations in FIG. 7 can be performed by the computing device 112, the head-mounted computing device 116, and/or a device of a network provider 508, as described above with respect to any one of FIGS. 1-5.

At operation 702, a consumption view of a three-dimensional scene in a three-dimensional immersive environment is displayed via a display of a head-mounted display device.

At operation 704, a switching control to switch from the consumption view of the three-dimensional scene to an authoring view of the three-dimensional scene is displayed and/or configured.

At operation 706, based on user input associated with the switching control, the authoring view of the three-dimensional scene is caused to be displayed via a display of a computing device connected to the head-mounted display device.

The disclosure presented herein may be considered in view of the following example clauses.

Example Clause A, a device comprising: a display; an interface configured to a connect the device to a head-mounted display device; at least one processor; and memory storing instructions that, when executed by the at least one processor, cause the device to perform operations comprising: displaying an authoring view of a three-dimensional scene via the display; receiving user input that selects a widget, the widget including information useable to access and display an object; using the widget to access and display the object in the authoring view of the three-dimensional scene; displaying an authoring control that enables a property of the object to be changed in the authoring view of the three-dimensional scene; changing the property of the object based at least in part on user input associated with the authoring control; displaying a switching control configured to switch from the authoring view of the three-dimensional scene to a consumption view of the three-dimensional scene in a three-dimensional immersive environment; and based on user input associated with the switching control, causing the consumption view of the three-dimensional scene in the three-dimensional immersive environment to be displayed via a display of the head-mounted display device.

Example Clause B, the device of Example Clause A, wherein the operations are implemented within a same platform that is configured to toggle between (i) an authoring mode that displays the authoring view by graphically projecting the three-dimensional scene on to a planar surface of the display and (ii) a consumption mode that displays the consumption view of the three-dimensional scene in the three-dimensional immersive environment via the display of the head-mounted display device.

Example Clause C, the device of Example Clause B, wherein the user input associated with the switching control captures a current state of data that is useable to generate the consumption view of the three-dimensional scene in the three-dimensional immersive environment via the display of the head-mounted display device without exiting the platform.

Example Clause D, the device of any one of Example Clauses A through C, wherein the authoring view of the three-dimensional scene comprises a private view for an authoring user that is not shared with other users.

Example Clause E, the device of any one of Example Clauses A through D, wherein the consumption view of the three-dimensional scene comprises a private view that enables an authoring user to preview the three-dimensional scene in the three-dimensional immersive environment via the display of the head-mounted display device.

Example Clause F, the device of any one of Example Clauses A through D, wherein the operations further comprise sharing the consumption view of the three-dimensional scene with other users.

Example Clause G, the device of any one of Example Clauses A through F, wherein the consumption view of the three-dimensional scene comprises an interaction control that enables a user to interact with the object, the interaction control not including the authoring control.

Example Clause H, the device of any one of Example Clauses A through G, wherein the property of the object comprises an initial display position of the object, a color of the object, a sound produced by the object in the three-dimensional scene, a display association between the object and another object, or a display association between the object and another three-dimensional scene.

Example Clause I, the device of any one of Example Clauses A through G, wherein the property of the object comprises a transform property comprising an initial display orientation of the object, a size of the object, a shading of the object, or a texture of the object.

Example Clause J, the device of any one of Example Clauses A through I, wherein the widget comprises a uniform resource locator and the widget is selected from a library of available widgets stored locally at the device or stored at a network provider.

Example Clause K, the device of any one of Example Clauses A through J, wherein the display of the device comprises a planar screen and the authoring view of the three-dimensional scene is displayed via a Web browser.

Example Clause L, the device of any one of Example Clauses A through K, wherein the operations further comprise: receiving a selection of a template that models a background for the three-dimensional scene, the template comprising spatial geometry data for the background; and retrieving the template from a library of templates to display the authoring view of the three-dimensional scene via the display.

Example Clause M, the device of any one of Example Clauses A through L, wherein the three-dimensional scene is part of an experience that comprises a plurality of three-dimensional scenes.

While Example Clauses A through M are described above with respect to a device, it is understood in the context of this disclosure that the subject matter of Example Clauses A through M can additionally or alternatively be implemented as a method or via computer readable storage media.

Example Clause N, a method comprising: displaying an authoring view of a three-dimensional scene via a display of a device; receiving first user input to add an object to the authoring view of the three-dimensional scene; adding, based at least in part on the first user input, an object to the authoring view of the three-dimensional scene; receiving second user input to switch from displaying the authoring view of the three-dimensional scene via the display of the device to a consumption view of the three-dimensional scene in a three-dimensional immersive environment via a display of a head-mounted display device that is connected to the device; and based on receiving the second user input, causing the consumption view of the three-dimensional scene in the three-dimensional immersive environment to be displayed via the display of the head-mounted display device.

Example Clause O, the method of Example Clause N, further comprising: displaying one or more authoring controls that enable a property of the object to be changed in the authoring view of the three-dimensional scene displayed via the display of the device; changing the property of the object in the authoring view of the three-dimensional scene based at least in part on additional user input associated with the one or more authoring controls; and displaying one or more interaction controls that enable a user to interact with the object in the consumption view of the three-dimensional scene displayed via the display of the head-mounted display device, wherein the one or more interaction controls do not include the one or more authoring controls.

Example Clause P, the method of Example Clause N or Example Clause O, further comprising capturing, based on the second user input, a state of data that is useable to generate the consumption view of the three-dimensional scene displayed in the three-dimensional immersive environment via the display of the head-mounted display device.

While Example Clauses N through P are described above with respect to a method, it is understood in the context of this disclosure that the subject matter of Example Clauses N through P can additionally or alternatively be implemented by a device or via computer readable storage media.

Example Clause Q, a head-mounted display device comprising: a display; an interface configured to a connect the head-mounted display device to another device; at least one processor; and memory storing instructions that, when executed by the at least one processor, cause the head-mounted display device to perform operations comprising: displaying a consumption view of a three-dimensional scene in a three-dimensional immersive environment via the display; configuring a switching control to switch from the consumption view of the three-dimensional scene to an authoring view of the three-dimensional scene; and based on user input associated with the switching control, causing the authoring view of the three-dimensional scene to be displayed via a display of the other device.

Example Clause R, the head-mounted display device of Example Clause Q, wherein the operations are implemented within a same platform that is configured to toggle between (i) a consumption mode that displays the consumption view of the three-dimensional scene in the three-dimensional immersive environment via the display of the head-mounted display device and (ii) an authoring mode that graphically projects the authoring view of the three-dimensional scene on to a planar surface of the display of the other device.

Example Clause S, the head-mounted display device of Example Clause Q or Example Clause R, wherein both the authoring view and the consumption view comprise a private view for an authoring user that is not shared with other users.

Example Clause T, the head-mounted display device of any one of Example Clauses Q through S, wherein the operations further comprise unlocking, based at least in part on the user input, one or more files used to generate the consumption view so that authoring of the three-dimensional scene continues.

While Example Clauses Q through T are described above with respect to a device, it is understood in the context of this disclosure that the subject matter of Example Clauses Q through T can additionally or alternatively be implemented as a method or via computer readable storage media.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A device comprising:
   a display;
   an interface configured to connect the device to a head-mounted display device;
   at least one processor; and
   memory storing instructions that, when executed by the at least one processor, cause the device to perform operations comprising:
      displaying an authoring view of a three-dimensional scene via the display, wherein the authoring view of the three-dimensional scene is displayed in association with an authoring mode in which content of the three-dimensional scene is being edited or created by an authoring user;
      receiving first user input that selects a widget, the widget including information useable to access and display an object;
      using the widget to access and display the object in the authoring view of the three-dimensional scene;
      displaying an authoring control that enables a property of the object to be changed in the authoring view of the three-dimensional scene;
      changing the property of the object based at least in part on user input associated with the authoring control;
      displaying a switching control configured to switch back and forth between the authoring view of the three-dimensional scene and a consumption view of the three-dimensional scene in a three-dimensional immersive environment, wherein the consumption view of the three-dimensional scene is displayed in association with a consumption mode in which a preview of the content of the three-dimensional scene is viewable by the authoring user;
      based on second user input associated with the switching control, locking a current version of one or more files useable to generate the three-dimensional scene so that the three-dimensional scene is unable to be further edited or created while being displayed via the consumption view; and
      causing the consumption view of the three-dimensional scene in the three-dimensional immersive environment to be displayed via a display of the head-mounted display device using the locked current version of the one or more files, wherein the consumption view of the three-dimensional scene comprises an interaction control that enables the authoring user to interact with the object, the interaction control not including the authoring control.

2. The device of claim 1, wherein the operations are implemented within a same platform that is configured to toggle between (i) the authoring mode that displays the authoring view by graphically projecting the three-dimensional scene on to a planar surface of the display and (ii) the consumption mode that displays the consumption view of the three-dimensional scene in the three-dimensional immersive environment via the display of the head-mounted display device.

3. The device of claim 2, wherein the user input associated with the switching control captures a current state of data that is useable to generate the consumption view of the three-dimensional scene in the three-dimensional immersive environment via the display of the head-mounted display device without exiting the platform.

4. The device of claim 1, wherein the authoring view of the three-dimensional scene comprises a private view for the authoring user that is not shared with other users.

5. The device of claim 1, wherein the operations further comprise sharing the consumption view of the three-dimensional scene with other users.

6. The device of claim 1, wherein the property of the object comprises an initial display position of the object, a color of the object, a sound produced by the object in the three-dimensional scene, a display association between the object and another object, or a display association between the object and another three-dimensional scene.

7. The device of claim 1, wherein the property of the object comprises a transform property comprising an initial display orientation of the object, a size of the object, a shading of the object, or a texture of the object.

8. The device of claim 1, wherein the widget comprises a uniform resource locator and the widget is selected from a library of available widgets stored locally at the device or stored at a network provider.

9. The device of claim 1, wherein the display of the device comprises a planar screen and the authoring view of the three-dimensional scene is displayed via a Web browser.

10. The device of claim 1, wherein the operations further comprise:
    receiving a selection of a template that models a background for the three-dimensional scene, the template comprising spatial geometry data for the background; and
    retrieving the template from a library of templates to display the authoring view of the three-dimensional scene via the display.

11. The device of claim 1, wherein the three-dimensional scene is part of an experience that comprises a plurality of three-dimensional scenes.

12. The device of claim 1, wherein the operations further comprise:
    displaying the switching control in the consumption view of the three-dimensional scene to switch from the consumption view of the three-dimensional scene back to the authoring view of the three-dimensional scene; and
    based on receiving additional user input associated with the switching control, causing the authoring view of the three-dimensional scene to be displayed via the display of the device.

13. A method comprising:
    displaying an authoring view of a three-dimensional scene via a display of a device, wherein the authoring view of the three-dimensional scene is displayed in association with an authoring mode in which content of the three-dimensional scene is being edited or created by an authoring user;

receiving first user input to add an object to the authoring view of the three-dimensional scene;

adding, based at least in part on the first user input, the object to the authoring view of the three-dimensional scene;

displaying a switching control configured to switch back and forth between the authoring view of the three-dimensional scene and a consumption view of the three-dimensional scene in a three-dimensional immersive environment, wherein the consumption view of the three-dimensional scene is displayed in association with a consumption mode in which a preview of the content of the three-dimensional scene is viewable by the authoring user;

receiving second user input, associated with the switching control, to switch from displaying the authoring view of the three-dimensional scene via the display of the device to displaying the consumption view of the three-dimensional scene in the three-dimensional immersive environment via a display of a head-mounted display device that is connected to the device;

based on receiving the second user input, locking a current version of one or more files useable to generate the three-dimensional scene so that the three-dimensional scene is unable to be further edited or created while being displayed via the consumption view; and causing the consumption view of the three-dimensional scene in the three-dimensional immersive environment to be displayed via the display of the head-mounted display device using the locked current version of the one or more files.

14. The method of claim 13, further comprising:
displaying one or more authoring controls that enable a property of the object to be changed in the authoring view of the three-dimensional scene displayed via the display of the device;

changing the property of the object in the authoring view of the three-dimensional scene based at least in part on additional user input associated with the one or more authoring controls; and displaying one or more interaction controls that enable the authoring user to interact with the object in the consumption view of the three-dimensional scene displayed via the display of the head-mounted display device, wherein the one or more interaction controls do not include the one or more authoring controls.

15. The method of claim 13, further comprising capturing, based on the second user input, a state of data that is useable to generate the consumption view of the three-dimensional scene displayed in the three-dimensional immersive environment via the display of the head-mounted display device.

16. The method of claim 13, further comprising:
displaying the switching control in the consumption view of the three-dimensional scene to switch from the consumption view of the three-dimensional scene back to the authoring view of the three-dimensional scene; and based on receiving additional user input associated with the switching control, causing the authoring view of the three-dimensional scene to be displayed via the display of the device.

17. A head-mounted display device comprising:
a display;
an interface configured to a connect the head-mounted display device to another device;
at least one processor; and
memory storing instructions that, when executed by the at least one processor, cause the head-mounted display device to perform operations comprising:
displaying a consumption view of a three-dimensional scene in a three-dimensional immersive environment via the display, wherein the consumption view of the three-dimensional scene is displayed in association with a consumption mode in which a preview of content of the three-dimensional scene is viewable by an authoring user;

configuring a switching control to switch back and forth between the consumption view of the three-dimensional scene and an authoring view of the three-dimensional scene, wherein the authoring view of the three-dimensional scene is displayed in association with an authoring mode in which the content of the three-dimensional scene is being edited or created by the authoring user;

based on user input associated with the switching control, unlocking a current version of one or more files useable to generate the three-dimensional scene so that the three-dimensional scene is able to be edited or created while being displayed via the consumption view; and causing the authoring view of the three-dimensional scene to be displayed via a display of the other device using the unlocked current version of the one or more files.

18. The head-mounted display device of claim 17, wherein the operations are implemented within a same platform that is configured to toggle between (i) the consumption mode that displays the consumption view of the three-dimensional scene in the three-dimensional immersive environment via the display of the head-mounted display device and (ii) the authoring mode that graphically projects the authoring view of the three-dimensional scene on to a planar surface of the display of the other device.

19. The device of claim 17, wherein both the authoring view and the consumption view comprise a private view for the authoring user that is not shared with other users.

* * * * *